United States Patent [19]

Barto et al.

[11] 4,059,409

[45] Nov. 22, 1977

[54] APPARATUS FOR ELIMINATING AMMONIA FUMES EMANATING FROM DIAZO COPIERS

[75] Inventors: Robert M. Barto, Wyckoff; Loren E. Shelffo, S. Orange, both of N.J.

[73] Assignee: Blu-Ray, Incorporated, Essex, Conn.

[21] Appl. No.: 666,314

[22] Filed: Mar. 12, 1976

[51] Int. Cl.[2] .......................... B01D 53/34; B01J 8/04; C01C 1/12; G03D 7/00

[52] U.S. Cl. .......................................... 23/284; 55/316; 55/387; 55/467; 354/300; 423/237

[58] Field of Search ....................... 23/284, 260; 55/70, 55/316, 350, 387, 467; 354/300; 423/235, 237, 239

[56] References Cited

U.S. PATENT DOCUMENTS

| | | | |
|---|---|---|---|
| 1,564,433 | 12/1925 | Mase | 55/70 X |
| 1,949,205 | 2/1934 | Herring et al. | 23/284 |
| 2,922,488 | 1/1960 | Gruner | 55/316 |
| 3,097,065 | 7/1963 | Gollmar | 55/70 UX |
| 3,496,704 | 2/1970 | Bandlow | 55/387 X |
| 3,679,369 | 7/1972 | Hashimoto et al. | 23/284 |
| 3,744,976 | 7/1973 | Tongue | 23/284 X |
| 3,800,515 | 4/1974 | Asker et al. | 55/387 X |

*Primary Examiner*—Joseph Scovronek
*Attorney, Agent, or Firm*—Francis J. Murphy; John M. Calimafde; Roy C. Hopgood

[57] ABSTRACT

Apparatus for the elimination of noxious ammonia fumes associated with diazo copiers includes a plenum chamber disposed about the output aperture of the machine developer chamber. Vacuum means are provided to draw the ammonia laden air out of this chamber. Preferably this apparatus is used in conjunction with a novel filter connected between the chamber and the vacuum means. The filter comprises a filter body of a material such as corrugated paper having a plurality of longitudinal substantially parallel channels, the walls of which are impregnated with a material, such as phosphoric acid, which will react with ammonia to generate odorless end products. A granular layer impregnated with such a material may be disposed in contact with the output end of this filter body.

26 Claims, 5 Drawing Figures

APPARATUS FOR ELIMINATING AMMONIA FUMES EMANATING FROM DIAZO COPIERS

BACKGROUND OF THE INVENTION

Diazo type copiers are well-known and have found extensive use in a variety of copying applications. The diazo process has, however, one undesirable side effect which has made it unpleasant to use. The developing agent utilized in the diazo process is ammonia which unfortunately emits a strong and offensive odor and provides varying degrees of discomfort for any personnel who may be exposed to it.

Various chemical and mechanical means have been implemented heretofore in an effort to lessen or eliminate these noxious ammonia fumes. Mechanical means used for this purpose include enclosed developing chambers and developing apparatus which applies the ammonia developing solution in measured amounts at the point of development. Although these mechanical devices have somewhat lessened the volume of ammonia fumes escaping into the atmosphere they have by no means solved the problem since the developing chamber of such copiers cannot be completely enclosed because the print to be developed must pass through the chamber and then out of the machine through some sort of exit aperture. Ammonia fumes can of course escape into the atmosphere either through this exit aperture or on the surface of the developed print.

In a further attempt to solve the ammonia fume problem the developing chamber may be evacuated by a vacuum source and the fumes from the chamber can be passed through a chemical solution in an effort to remove the ammonia odor. Chemical solutions used in the past to accomplish this function have often been caustic and/or messy and have generally been bulky, hard to handle liquids. In most instances such chemical solutions are also expensive to purchase and use.

Applicant has solve the problem of offensive ammonia odor by a combination of mechanical and chemical means. A plenum chamber is disposed adjacent to the output aperture of the developer chamber to trap and exhaust a large percentage of the waste ammonia gases which might otherwise escape from the chamber through this aperture. Vacuum means are also provided to remove the ammonia fumes from the plenum chamber and pass them through a novel easily replaceable filter cartridge in which they are eliminated in an efficient and inexpensive manner.

SUMMARY OF THE INVENTION

Apparatus for eliminating ammonia fumes emanating from the output aperture of an apparatus for the development of sheet-like prints, includes an enclosure surrounding this output aperture. One wall of this enclosures has an aperture through which the interior of the enclosure is connected to a filter assembly by coupling means such as a hose. Suction means, such as a fan, are provided to draw air from the enclosure through the coupling means corrected to a filter assembly to filter out the ammonia fumes. The filter assembly includes a filter body of a material such as corrugate having a plurality of longitudinal channels extending through the body, the walls of which are impregnated with a material which chemically reacts with the passing ammonia fumes to provide odorless products.

DESCRIPTION OF THE INVENTION

Figure 1:
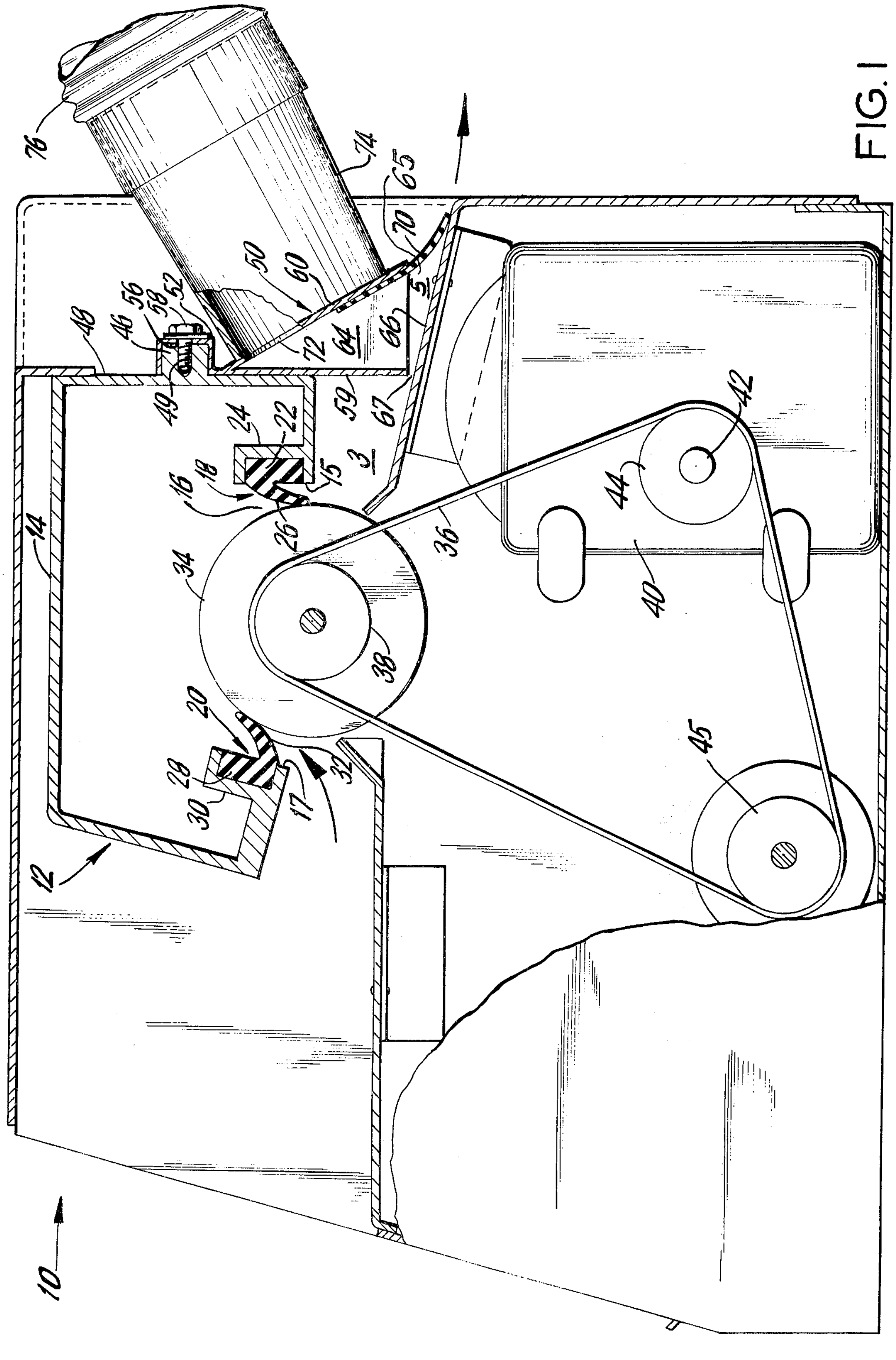
FIG. 1 is a sectional view of the developer section of a diazo copier including the plenum chamber of this invention.
Figure 2:
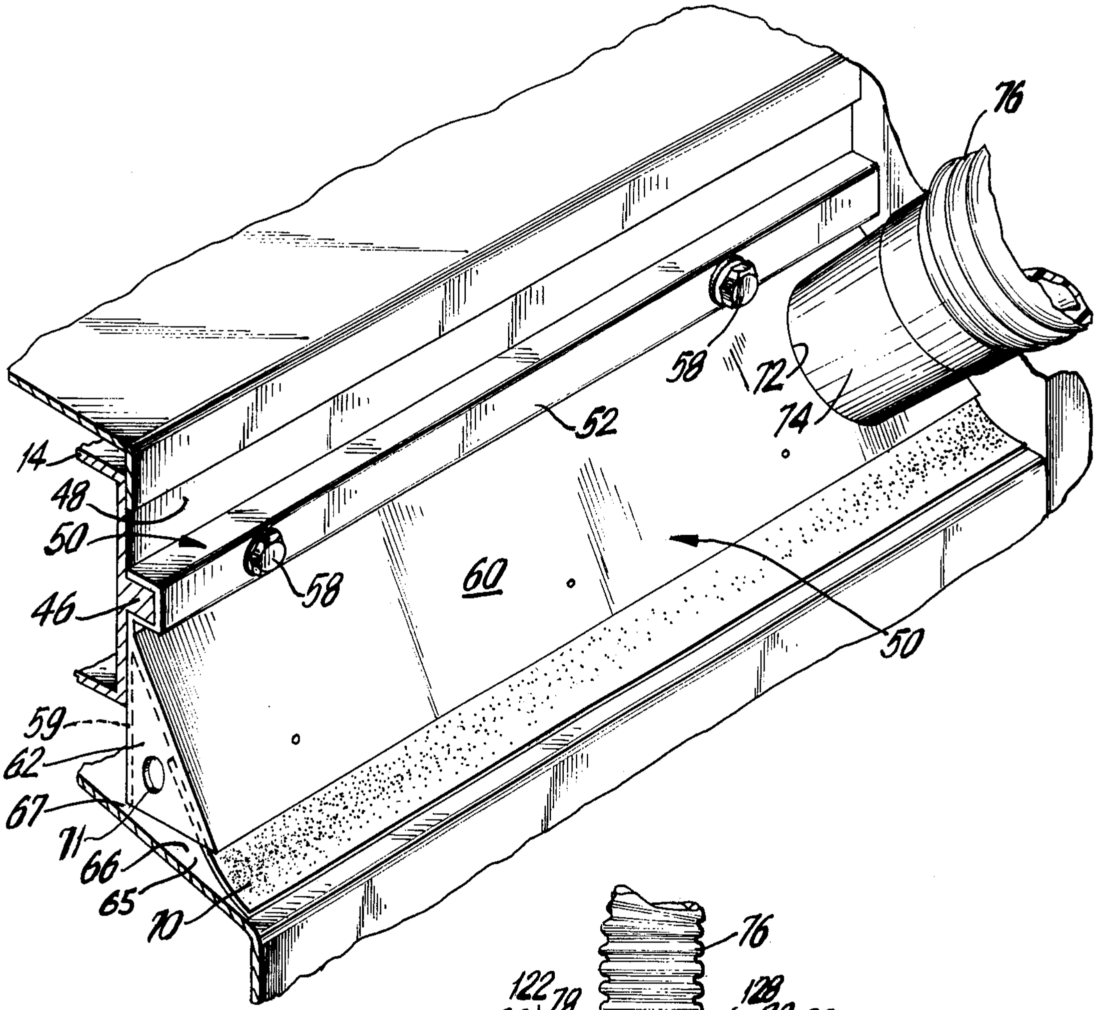
FIG. 2 is a prospective view of a part of the diazo copier of FIG. 1 including the plenum chamber.

A diazo copying machine 10 includes a developing section 12. The developing section 12 includes a developing tank 14 having an elongated aperture 16 formed in its lower surface. A first and second seals 18 and 20 which may be made of any flexible material such as rubber or plastic are disposed respectively along mutually opposed sides of aperture 16. Seal 18 comprises an elongated substantially rectangular portion 22 which is configured to fit within a C shaped elongated bracket 24 disposed along a first side 15 of aperture 16. A flexible lip 26 extends outwardly from the rectangular portion 22 of seal 18. Seal 20 similarly includes a rectangular portion 28 configured to fit within a second C shaped elongated bracket 30 which is disposed along a second substantially opposed side 17 of aperture 16. A second flexible lip 32 extends outwardly from the rectangular portion 28 of seal 20.

A cylindrical developer roller 34 is disposed within aperture 16 of tank 14 so that the ends of the flexible lips 26 and 32 of seals 18 and 20 respectively are in contact with the circumference of the roller 34 to cooperate with developer roller 34 to effectively seal aperture 16. As can be seen in FIG. 1 roller 38 is fixedly attached to developer roller 34. Belt 36 which is around roller 38 can be driven by a motor 40 which rotates shaft 42 and attached roller 44. Roller 44 will cause the belt 46 to move rotating roller 38 and attached roller 34 and roller 45 which is used for other machine functions.

A projecting portion 46 extends outwardly from one side 48 of housing 14. A bracket 50 includes substantially C shaped portions 52 configured to fit over the projecting portion 46 of wall 48. Means such as one or more threaded apertures 49 may be provided in projecting portion 52 and one or more matching apertures 56 may be provided in the C shaped portion of bracket 50. Screws such as 58 may then be employed to fixedly attached bracket 50 to wall 48 of tank 14 without extending these screws through the wall of tank 14. Beneath portion 52 of bracket 50 extends downwardly and includes two members 59 and 60 which join at an acute angle to form a triangular structure. Member 59 extends along wall 48 and member 60 extends outwardly from wall 48 to define two walls of the structure. Substantially triangular end walls 62 and 64 are attached to respective ends of bracket members 58 and 60 to complete the structure which is open on its bottom side. An aperture 71 is provided in end wall 62 to permit the entry of air as described below.

A guide surface 66 formed by an upper wall of copying machine 10 begins at a point adjacent to developer roller 34 and extends outwardly beneath the lower ends of bracket members 59 and 60. Guide surface 66 is spaced from the lower end of brackets 59 and 60 to define slot like apertures 67 and 65, respectively. A flap 70 of a flexible material such as rubber or plastic is attached to the inner surface of bracket member 60 and extends downwardly past the end of bracket member 60 to contact the sloping guide surface 66 to provide a flexible closure for the space between the end of bracket 60 and surface 66.

A substantially circular aperture 72 is formed in the bracket member 60 adjacent to end wall 64. A preferably cylindrical coupling member 74 is fixedly attached to the outer surface of bracket member 60 so that it encloses aperture 72 and extends outwardly substantially perpendicularly to the surface of bracket 60. A hose 76 of preferably flexible material such as rubber or plastic, whose inner circumference forms an interference fit with the outer circumference of coupling member 74 has a first end attached about the coupling member 74 and a second end attached to a vacuum source in the manner to be described below.

Figure 3:
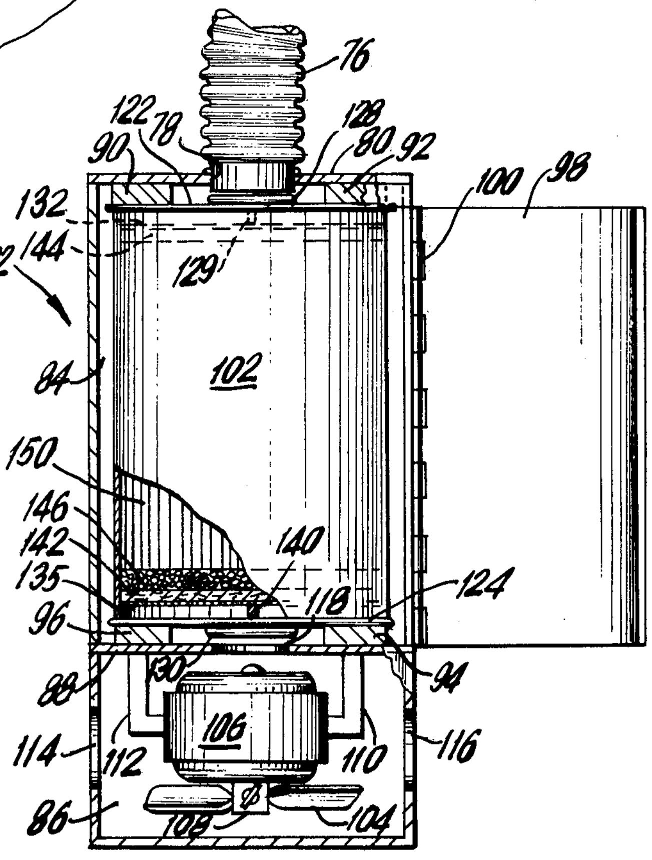
FIG. 3 is a partially sectional view of the filter assembly and cabinet.

As shown in FIG. 3 the second end of flexible hose 76 extends through an aperture 78 in the top wall 80 of rectangular box like cabinet 82. Cabinet 82 is divided into an upper chamber 84 and a lower chamber 86 by a transverse interior wall 88. The upper chamber 84 includes spacers 90 and 92 attached to top wall 80 and 94 and 96 attached to the top surface of inner wall 88. Means to open one wall of chamber 84 may be provided, such as door 98, which is attached to cabinet 82 by a hinge 100. A filter body 102 to be described more fully below is mountable within chamber 84 so that it rests on bottom spacers 94 and 96, which are arranged on interior wall 88.

The lower chamber 86 houses a fan 104 having a motor 106 and a rotatable blade assembly 108. If desired a centrifugal fan may be used in place of the axial fan shown and described herein. The fan 104 is supported within chamber 86 by mounting brackets 110 and 112. Vent apertures 114 and 116 are provided in the walls of chamber 86 and a substantially centrally located aperture 118 is provided in interior wall 88 linking chambers 84 and 86.

Filter body 102 will now be described in detail with reference to FIGS. 4 and 5. The preferred embodiment shown in cross section FIG. 4 includes a cylindrical outer housing 120 which may be made of any suitable material such as a metal or plastic. The cylindrical housing includes a top and bottom closure 122 and 124 which comprise discs having outer radii which are substantially equal to the inner radius of the cylindrical housing 120. The closures 122 and 124 are fixedly attached about their respective circumferences to the inner surface of housing 120 to define a filter chamber 126. Centrally disposed apertures 123 and 125 are formed respectively top and bottom in closures 122 and 124. Raised borders such as 128 and 130 may be provided about the apertures 123 and 125.

Perforated discs 132 and 134 which may be made for instance of metal, having an outside diameter substantially equal to the inside diameter of housing 120, are spaced at predetermined distances chambers 136 and 138 disposed respectively at either end of the filter 102. Perforated discs 132 and 134 each include a plurality of apertures extending through such discs such as apertures 133 in disc 132 and apertures 135 in disc 134. A first and second spacers 129 and 140 are attached to the respective outer surfaces of perforated discs 132 and 134. Each of these spacers may be shown in FIG. 5 include two mutually orthogonal members. Arranged on the inner sides of perforated discs 132 and 134 respectively are two layers 142 and 144 of an air permeable substantially chemically inert material such as glass fibers.

A layer 146 of granular material such as activated charcoal or vermiculite may be disposed on the lower layer 142. The nature and constitution of this layer is described more fully below. As will also be described below this layer may be dispensed with if certain types of filter bodies 150 are employed. The filter body 150 of the filter 102 consists of bleached corrugate attached to a backing of high wet strength by a water resistant adhesive. In general terms the body of the filter may comprise any fluted material which absorbs the phosphoric acid solution described below without being destroyed by it. The body 150 of the filter 102 is prepared by taking a sheet of a suitable corrugated material and rolling the sheet to form a cylinder of the desired diameter which is approximately equal to the inside diameter of housing 120. A cylinder of special seal type "A" flute corrugated having a diameter of approximately 7 inches and a height of approximately 10 inches has been found to provide sufficient reaction surface on its flute walls.

This corrugate cylinder is then immersed in a suitable phosphoric acid solution, such as solution may for instance consist of approximately 70% phosphoric acid ($H_3PO_4$), 29-½% water and ½% of a liquid detergent by weight. The liquid detergent is included to improve the wettability of the corrugate. The corrugate cylinder is permitted to remain immersed in this solution for a period sufficient to ensure that it has absorbed a maximum amount of the phosphoric acid solution. It is then removed from this solution and thoroughly drained before mounting in the housing 120.

It has been found that a B Type corrugate comprising approximately 50+2 flutes per foot and in which each such flute extends a maximum distance outward from the backing of approximately ⅛ inch can provide an adequate filter when in the absence of granular layer 146. "A" type corrugate comprising approximately 36+2 flutes per foot and in which each such flute extends a maximum distance outwardly from the support surface of approximately 3/16 inch can be used as filter body 150 with the addition of granular layer 146. The reasons for this are based on the smaller flute size of the B corrugate and are discussed below.

It has been found that vermiculites and specifically pearlite works adequately as the granular layer 146 with the inventive filter 102. In general terms vermiculites are micaceous minerals consisting of hydrated magnesium-aluminum-iron silicate. The general structural formula for vermiculites is $$(H_2O) - (Mg,Ca,K)-(AL,FE,Mg)-(SiA_2Fe)_4O,O(OH)_2$$

As indicated above in addition to vermiculites, activate charcoal granuales are also usable as a layer 146. Regardless of the materials used, particles within the screen size range of 1/64 inch to 5/32 inch are usable in combination with the filter body described herein. Particles smaller than a screen size of 1/64 inch provide too great a restriction in air flow through the filter while particles having a screen size larger than 5/32 inch will not form the required interparticle seal discussed more fully below. Preferably the range of particles used in layer 146 will be within the range of screen sizes as 1/32 inch to 5/32 inch. Specifically it has been found that a particle distribution comprising 5% of particles having a screen size of 1/32 inch, 22% of particles having a screen size of 1/16 inch, 46% of particles having a screen size of 3/32 inch, 22% of particles having a screen size of ⅛ inch and 5% of particles having a screen size of 5/32 inch provides a superior result.

It has been found that the air pressure drop across layer 146 should ideally be approximately 0.2 of an inch of water during filter operation. Utilizing the above particle distribution the total thickness of layer 146 should be between ½ and ⅛ inch to provide this pressure drop. For the reasons described more fully below this pressure drop will vary over the useful life of the filter 102 increasing as more and more of the ammonia reacts with the phosphoric acid.

The operation of the inventive scavenging device will now be discussed. A print to be developed enters the developing tank 14 between the outer end of flexible lip 32 of seal 20 and the outer circumference of developer roller 34. A source of ammonia which is not shown provides an ammonia rich atmosphere within developer tank 14 which develops the diazo print as it passes through the tank 14 held to the circumference of the roller 34 by "hold down" bands, which are not shown. When the print reaches seal 18 on the opposite side of aperture 16 is passed out of tank 14 between the flexible lip 26 and the surface of roller 34. As the print leaves developing tank 14 its leading edge encounters sloping guide surface 66 which deflects it along surface 66 through slot like aperture 67 and it passes out of the copier machine between flexible closure 70 and guide surface 66.

As is best seen in FIG. 1 the exiting print passes through a plenum chamber comprising a first internal chamber 3 defined by lip 26, the lower surface of tank 14, guide surface 66 and the inner surface of bracket member 59. After passing through slot like aperture 67 it passes through an external chamber 5 defined by bracket member 58, bracket member 60 and flexible flap 70. Both the rotating roller 34 and the exiting print tend to carry ammonia fumes from the interior of tank 14 past seal 18 into interior chamber 3. From chamber 3 these fumes either leak through aperture 67 or pass through this aperture on the surface of the exiting print and are thus transmitted to exterior chamber 5.

In order to prevent the escape of ammonia fumes from the exterior plenum chamber 5 to the outside atmosphere the fan 104 shown in FIG. 3 is arranged to draw air from the exterior through input aperture 71 in end wall 62 into plenum chamber 5 and then out of chamber 5 through aperture 72 in bracket 60, into flexible hose 76 and thence through the filter assembly 102. By providing a suction at aperture 72, room air is drawn into chamber 5 through aperture 71 and the ammonia laden atmosphere is constantly drawn out of chamber 5 through aperture 72 causing an air flow across the exiting developed print which tends to sweep any residual ammonia off its surface. This suction also creates a lower pressure in the inner surface of flexible flap 70 than on the outer surface thereby substantially retarding any tendency for ammonia ladened air to leak out of chamber 5 between flap 70 and guide surface 66. The provision of inner and outer plenum chambers 3 and 5 respectively and the vacuum source provide by fan 104 substantially lessens the escape of ammonia fumes from copier 10 but some means must be provided to treat the ammonia ladened air passing through hose 76 in order to completely eliminate the problem of ammonia odor. Ammonia ladened air is treated as it passes through filter apparatus 102 as described below.

Figure 4:
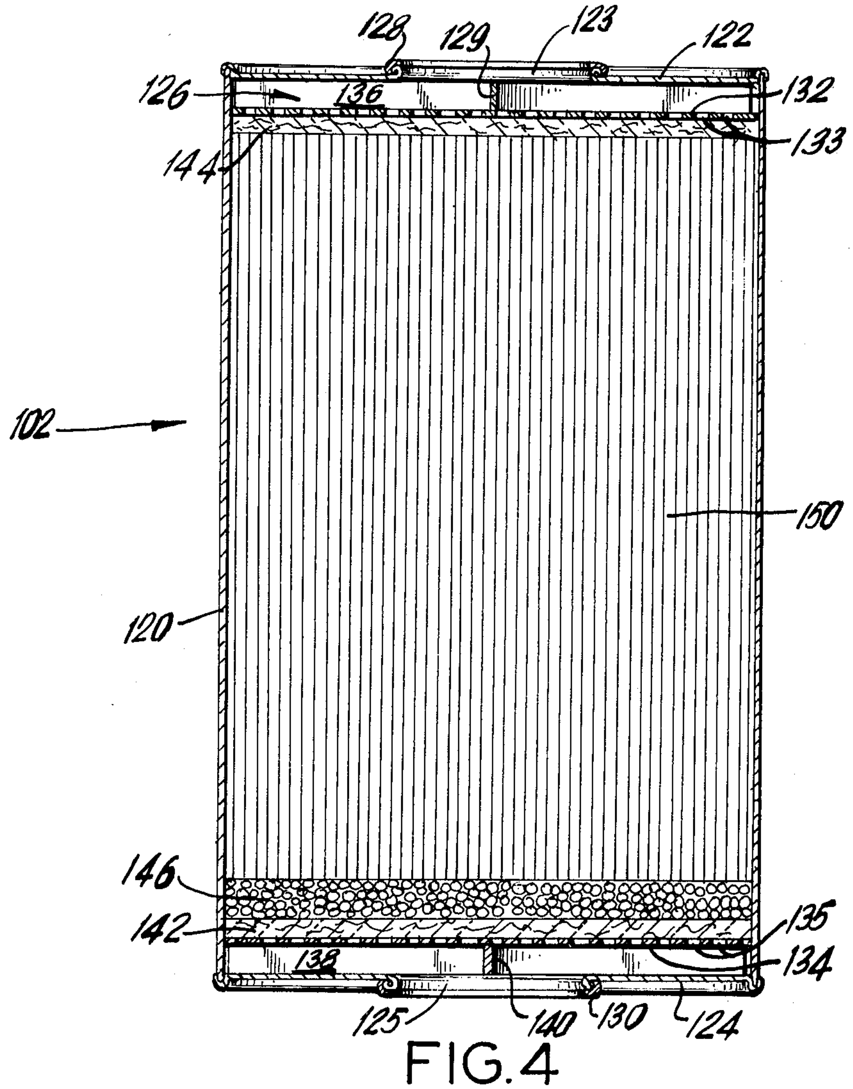
FIG. 4 is an enlarged sectional view of the filter assembly of FIG. 3.
Figure 5:
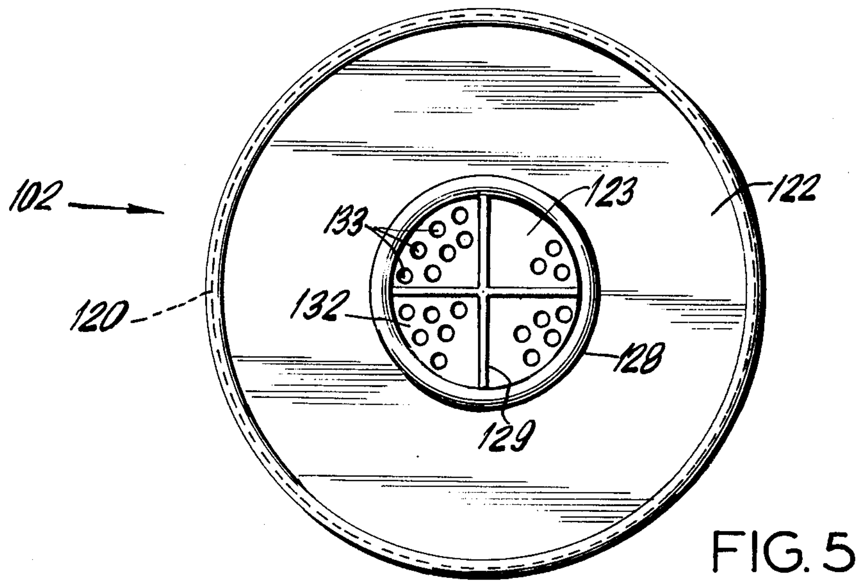
FIG. 5 is a top view of the filter assembly of FIG. 4.

Referring now to FIGS. 3 and 4 the ammonia laden air enters filter cabinet 82 through aperture 78 at points substantial along the central axis of filter 102 and above the circular central aperture 123 in top closure 122. As can best be seen in FIG. 3 flexible hose 76 terminates within cabinet 82 at a point immediately above aperture 123. After passing through aperture 123 the incoming air spreads outwardly within the circulation chamber 136 between the upper closure member 122 and perforated disc 134 thereby permitting the incoming air to encounter the entire upper surface of filter 102.

The incoming air is drawn downwardly through filter 102 by the partial vacuum created by fan 104 and it passes first through the apertures 133 in perforated disc 132 and encountering the glass fibers disc 144. The glass fibers in this disc is inert chemically but its intertwined fibers serve to further spread the incoming air across the lateral surface of the corrugated central filter body 150. As described above the main filter body 150 consists of a material such as corrugate having a plurality of longitudinally disposed passages or flutes. The incoming air passes through these passages as it traverses the filter body 150. The walls of each of these passages are impregnated the phosphoric acid solution described above so that as the air passes through each passage its ammonia content is exposed to phosphoric acid on the walls and it reacts with this acid as set forth in the following formulas:

$$H_3PO_4 + NH_4OH \rightarrow (NH_4)H_2PO_4 + H_2O$$

$$NH_4OH + (NH_4)H_2PO_4 \rightarrow (NH_4)_2HPO_4 + H_2O$$

$$H_3PO_4 + 2NH_4OH \rightarrow (NH_4)_2HPO_4 + 2H_2O$$

The final product of these reactions is a solid $(NH_4)_2HPO_4$ which is deposited on the walls of the filter passages and water which passes out of the filter with the exiting air. This reaction consumes the liquid phosphoric acid on the passages and generates a solid crystalline substance $(NH_4)_2HPO_4$ which can absorb no further ammonia.

After leaving the lower end of each of the passages comprising filter body 150 the air may be passed through a layer of granular material 146 which is composed preferably of a vermiculites as described above. The granuales of this layer are also impregnated with phosphoric acid which wets the surface of each grain. By contrast to the main filter body 150 in which the flutes provide a plurality of substantially straight air passages of relatively large cross sectional area the granular layer 146 provides a multitude of smaller, branching, tortuous passages between and around the grains constituting the granular material. The average cross sectional area of these passages and the number of such interconnecting passages encountered in traversing the layer 146 is a function of the particle distribution of and the thickness of the layer. The phosphoric acid on the surface of the particles in layer 146 reacts with any residual ammonia in the passing airstream by the formula above and thereby acts as a further filter.

The layer 146 has, however, a more important function. As the solid $(NH_4)_2HPO_4$ is formed in this layer as a result of the above reaction it forms solid bridges between grains and prevents the passage of air through reacted portions of the layer 146. When the phosphoric acid in one of the flutes of filter body 150 is exhausted the air would pass through the passage without decrease in its ammonia content thereby rendering the filter inoperative even though other parallel flutes in filter 150 had unreacted phosphoric acid and were capable of removing substantial additional amounts of ammonia. If, however, the air emerging from each of the flutes of body 150 immediately encounters the adjacent top surface of granular layer 146 the air must then pass through a relatively small passages of the layer 146 in order to pass out of the filter. As the phosphoric acid on the walls of a given flute is exhausted, the phosphoric acid in granular layer 146 takes over the filtering function but as indicated above when this layer is exhausted it forms a solid mass between particles beneath the exhausted flute and substantially raises the pressure drop through the exhausted passage directly above it.

Functionally layer 146 never completely blocks a flute but it sufficiently raises the pressure drop across the flute so as to cause air to pass through other parallel unreacted flutes having lower pressure drops. Utilization of the layer 146 thereby permits the utilization of all or substantially all the phosphoric acid on the walls of each of the flutes before the filter is incapable of performing its function. The filter finally becomes inoperative when enough of the layer 146 has solidified to create too great a pressure drop across the filter. If a B type corrugate is used for filter body 150 the flutes are sufficiently small such that the buildup of crystalline $(NH4)_2PO_4$ on the walls of reacted flutes will provide a sufficient pressure differential between reacted and unreacted flutes to cause the air stream to follow parallel unreacted flutes in preference to those in which the phosphoric acid solution has reacted. An increase of pressure drop of approximately 50% in a reacted flute is adequate for this purpose.

By proper choice of filter size it is possible to provide a filter 102 which is capable of absorbing all the ammonia which can be generated by a single container of developer solution, so that the filter 102 may be changed simultaneously with the developer. For this purpose it has been found that 1200 grams of available phosphoric acid in the filter is adequate to dispose of all the ammonia generated by a one gallon developer bottle. If other size developer containers are utilized suitable adjustments in the phosphoric acid of the filter can of course be made.

For this quantity of phosphoric acid it has been found that a central filter body 150 of special seal "A" type corrugate wound in a cylinder of a diameter of approximately 7 inches and a height of approximately 10 inches provides adequate reacting surface. A granular layer approximately ½ inch in thickness and 7 inches in diameter has been used with this filter body.

After passing through layer 146 the air leaves filter 102 by passing through a second layer of glass fibers 142 and the apertures 134 in the disc 135. It then passes out of filter 102 through lower aperture 125 and into the lower aperture 125 and into the lower cabinet chamber 86 through aperture 118 in wall 88. The purified air then passes out of the filter cabinet through vents such as those shown as 114 and 116 in FIG. 3.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and appended claim.

We claim:

1. Apparatus for eliminating noxious fumes emanating from equipment used for the development of sheet-like prints, such equipment having means to develop said prints including a developing tank, a guide surface extending outwardly from said developing tank along which such prints are expelled from the equipment, and a wall member spaced a predetermined distance from said guide surface to form an elongated output aperture for said prints, said apparatus including an enclosure attached to said wall of said equipment so that it extends along and partially covers said output aperture, said enclosure including a first and second members each of which has at least one elongated side, and a first and second transverse ends, said first member having a portion which is spaced from said second wall of said equipment and extends toward said guide surface terminating in said one elongated longitudinal side of said first member which is adjacent to, but spaced from, said guide surface at a line spaced along said guide surface from said output aperture to form a first output slot, said first member having an aperture formed in said extending portion adjacent to said first end, and said second member extending substantially across said output aperture and terminating in said elongated longitudinal side of said second member which is adjacent to, but spaced from, said guide surface to form a second output slot, at least one end piece, said end piece being connected between the first transverse ends of said first and second members, and an elongated flexible member attached along said longitudinal side of said first member and extending across said first output slot to contact said guide surface;

a filter assembly including a filter body which is adapted to absorb said noxious fumes from air passing therethrough;

coupling means connected between said aperture in said first wall member and said filter means; and suction means adapted to draw air from said enclosure through said coupling means and said filter means.

2. Apparatus as claimed in claim 1 in which said coupling means includes a member attached to said first member so as to completely surround said aperture in said first member and a flexible connector configured to fit tightly over said member.

3. Apparatus as claimed in claim 1 in which said filter body of said filter assembly includes an input and an output transverse end surfaces and a plurality of substantially longitudinal channels extending through said body from said input to said output transverse end surface, the walls defining each of said channels being impregnated with a solution of phosphoric acid.

4. Apparatus as claimed in claim 3 including a layer of granular material chosen from a group of materials comprising vermiculites and activated charcoal in contact with said output transverse surface of said filter body, said granular material being impregnated with a solution of phosphoric acid.

5. Apparatus as claimed in claim 4 in which said granular material is chosen such that substantially all particles of said material are within the range of screen sizes or from 1/64 inch to 5/32 inch.

6. Apparatus as claimed in claim 4 in which said granular material is pearlite comprising 5% by weight of particles having a screen size of approximately 1/32 inch, 22% by weight of particles having a screen size of approximately 1/16 inch, 46% by weight of particles having a screen size of approximately 3/32 inch, 22% by weight of particles having a screen size of approximately $\frac{1}{8}$ inch and 5% by weight of particles having a screen size of approximately 5/32 inch.

7. Apparatus as claimed in claim 3 in which said filter body is composed of corrugated paper and in which the flutes of said corrugated paper comprise said channels.

8. Apparatus as claimed in claim 7 in which said filter body is composed of a corrugated paper having approximately 50 flutes per foot and in which the maximum distance across each such flute is approximately $\frac{1}{8}$ inch.

9. Apparatus as claimed in claim 4 in which said granular material is pearlite and said layer has a thickness within the range of $\frac{1}{8}$ inch to $\frac{1}{2}$ inch and said filter body is composed of a corrugated paper having approximately 36 flutes per foot and in which the maximum distance across each such flute is approximately 3/16 inch.

10. Apparatus as claimed in claim 1 in which said filter assembly includes a housing configured to fit around said filter body, said housing having top and bottom closures each of said closures having an aperture extending respectively therethrough, first and second sheetlike members having a plurality of apertures therethrough, said first and second sheetlike members being fixedly attached to said housing at predetermined substantially equal distances from said first and second closures, and a first and second layers of glass fibers fixedly attached to said housing and arranged respectively adjacent to said first and second sheetlike members, said first sheet of glass fibers being between said first sheetlike member and said input end of said filter body and said second layer of glass fibers being disposed between said second sheetlike member and said output end of said filter body.

11. Apparatus as claimed in claim 10 including a layer of granular material chosen from a group comprising vermiculites and activated charcoal disposed between said second layer of glass fibers and said output end of said filter body.

12. Apparatus as claimed in claim 1 including a cabinet having a first and second interconnected chambers configured respectively to contain said filter assembly and said suction means said cabinet further including a first exterior wall enclosing a portion of said first chamber, said first exterior wall having an input aperture therein, and a second exterior wall enclosing a portion of said second chamber, said second exterior wall having an output aperture formed therein, said coupling means being connected to said first chamber through said input aperture and said suction means being adapted to draw air laden with said noxious fumes from said enclosure through said coupling means through said input aperture into said first chamber and through said filter body to remove said fumes.

13. Apparatus as claimed in claim 1 including a second end piece connected between said second transverse ends of said first and second members.

14. Apparatus as claimed in claim 1 in which said developing tank has an aperture having opposed elongated sides and in which said means to develop sheetlike prints further includes a roller having an elongated cylindrical surface which conveys said prints into and out of said developing tank, at least a portion of said roller extending through said aperture so that said elongated cylindrical surface passes through said tank and in which said apparatus further includes first and second elongated flexible members attached along said elongated sides of said aperture, each of said flexible members having a portion which extends into said aperture and contacts said elongated cylindrical surface of said roller to seal said fumes within said developing tank.

15. Apparatus for eliminating noxious fumes emanating from the developing unit of equipment used to develop sheetlike prints, such developing unit including a developing tank having an aperture with opposed elongated sides, a roller having an elongated cylindrical surface which conveys said prints into and out of said developing tank, at least a portion of said roller extending through said aperture so that said surface passes through said tank and such equipment further including a guide surface extending away from said developing unit along which developed prints are expelled from the equipment, and a wall member spaced a predetermined distance from said guide surface to form an elongated output aperture for said prints, said apparatus including first and second elongated flexible members attached respectively along said elongated sides of said developing tank aperture, each of said flexible members having a portion which extends into said developing tank aperture and contacts said elongated cylindrical surface of said roller to seal said fumes with said developing tank;

an enclosure attached to said wall of said equipment so that it extends along and partially covers said output aperture, said enclosure including a first and second members each of which has at least one elongated longitudinal side and a first and second transverse ends, said first member having a portion which is spaced from said second wall of said equipment and extends toward said guide surface terminating in said one elongated longitudinal side of said first member which is adjacent to, but spaced from, said guide surface at a line spaced along said guide surface from said output aperture to form a first output slot, said first member having an aperture formed in said extending portion adjacent to said first end, and said second member extending substantially across said output aperture and terminating in said elongated longitudinal side of said first member which is adjacent to, but spaced from, said guide surface to form a second output slot;

at least one end piece, said end piece being connected between the first transverse ends of said first and second members;

an elongated flexible member attached along said longitudinal side of said first member, said flexible member extending across said first output slot to contact said guide surface; and means to remove fumes escaping from said developing unit from said enclosure through said aperture in said member.

16. Filter apparatus for removing ammonia from ammonia laden air including a filter body having an input and an output substantially transverse end surfaces and a plurality of substantially longitudinal channels extending through said body from said input to said output end surfaces, the walls of each of said channels being impregnated with phosphoric acid, and a layer of granular material which is disposed in contact with substantially the entire area of the output end surface of said filter body, said layer of granular material being impregnated with phosphoric acid and said granular material being chosen from a group of materials consisting of the vermiculites and activated charcoal.

17. Filter apparatus as claimed in claim 16 in which said filter body is composed of corrugated paper having approximately 50 flutes per foot, said flutes forming said channels and in which the maximum distance across each said flute is approximately ⅛ inch.

18. Filter apparatus as claimed in claim 16 in which said granular material is chosen such that substantially all particles of said material are within the range of screen sizes of from 1/64 inch to 5/32 inch.

19. Filter apparatus as claimed in claim 18 in which said granular material is pearlite comprising 5% by weight of particles having a screen size of approximately 1/32 inch, 22% by weight of particles having a screen size of approximately 1/16 inch, 46% by weight of particles having a screen size of approximately 3/32 inch, 22% by weight of particles having a screen size of approximately ⅛ inch and 5% by weight of particles having a screen size of approximately 5/32 inch.

20. Filter apparatus as claimed in claim 16 in which said granular material is pearlite and said layer of granular material has a thickness of within the range of ⅛ inch to ½ inch and said filter body is composed of a coil of corrugated paper having approximately 36 flutes per foot each of said flutes having a maximum cross section of 3/16 inch.

21. Filter apparatus as claimed in claim 16 including a housing configured to fit around said filter body and said layer of granular material, said housing having top and bottom closures each of said closures having an aperture extending therethrough to permit the passage of air into and out of said housing; and dispersion means disposed between said top closure and said input surface of said filter body to disperse said ammonia laden air across said input surface of said body.

22. Filter apparatus as claimed in claim 21 in which said dispersion means includes a layer of glass fibers disposed between said top closure and said input surface of said filter body.

23. Filter apparatus as claimed in claim 16 in which said filter body consists of a coil of corrugated paer, said corrugated paper having between 36 and 50 flutes per foot with the maximum distance across each such flute being between ⅛ inch and 3/16 inch, said flutes forming said substantially longitudinal channels.

24. Filter apparatus as claimed in claim 16 in which said layer of granular material has a thickness of between ⅛ inch and ½ inch and in which said granular material is pearlite having substantially all particles within the range of screen sizes of from 1/64 inch to 5/32 inch.

25. Apparatus as claimed in claim 16 in which said filter apparatus includes a housing configured to fit around said filter body and said layer of granulated material, said housing having top and bottom closures each of said closures having an aperture extending respectively therethrough, first and second sheetlike members having a plurality of apertures therethrough, said first and second sheetlike members being fixedly attached to said housing at predetermined substantially equal distances respectively from said first and second closures, and a first and second layers of glass fibers fixedly attached to said first and second sheetlike members, said first sheet of glass fibers being between said first sheetlike member and said input end of said filter body and said second layer of glass fibers being disposed between said second sheetlike member and said layer of granular material.

26. Filter apparatus as claimed in claim 25 including suction means to draw said ammonia laden air through said filter body and said granular layer and a cabinet having a first and second interconnected chambers said first chamber being adapted to enclose said housing and said second chamber being adapted to house said suction means.

* * * * *